United States Patent [19]

Enequist

[11] Patent Number: 5,123,727
[45] Date of Patent: Jun. 23, 1992

[54] METHOD AND APPARATUS FOR PRODUCING A MEASURED VALUE INDICATIVE OF FOCUSING CORRECTLY ADJUSTED SHARPNESS AT PROJECTED PICTURES

[76] Inventor: Carl S. H. Enequist, Erik Dahlbergsgatan 29A, S-115 32 Stockholm, Sweden

[21] Appl. No.: 651,225
[22] PCT Filed: Aug. 5, 1988
[86] PCT No.: PCT/SE88/00397
 § 371 Date: Feb. 5, 1991
 § 102(e) Date: Feb. 5, 1991
[87] PCT Pub. No.: WO90/01725
 PCT Pub. Date: Feb. 22, 1990
[51] Int. Cl.⁵ .............................................. G03B 3/00
[52] U.S. Cl. ...................... 352/140; 355/44; 355/45; 355/77
[58] Field of Search ................ 352/140; 355/44, 45, 355/77

[56] References Cited

U.S. PATENT DOCUMENTS 3,560,647 2/1971 Harmon .......................... 352/140
3,596,101 7/1971 Someya et al. ................... 352/140
3,622,797 11/1971 Bragg .............................. 352/140
4,192,585 3/1980 Henkelmann et al. ............ 352/140
4,383,274 5/1983 Inuiya .............................. 352/140
4,523,829 6/1985 Eguchi et al. .................... 352/140

FOREIGN PATENT DOCUMENTS 456457 10/1988 Sweden .
484443 2/1970 Switzerland .
2160734 12/1985 United Kingdom .

Primary Examiner—Monroe H. Hayes
Attorney, Agent, or Firm—Hill, Van Santen, Steadman & Simpson

[57] ABSTRACT

The present invention relates to a method and apparatus for carrying out the focusing of projected images. To carry out such focusing, an image sensor operates on a small section of the projected image to blow it up to a point where only the grains of the image become larger than the resolution of the sensor. The image set obtained is electronically scanned so that a signal is received which includes a low frequency band determined by the grain density and a harmonic span generated by the transitions between grains and interstices, whereby a differential voltage is created which is indicative of the state of focusing.

11 Claims, 1 Drawing Sheet

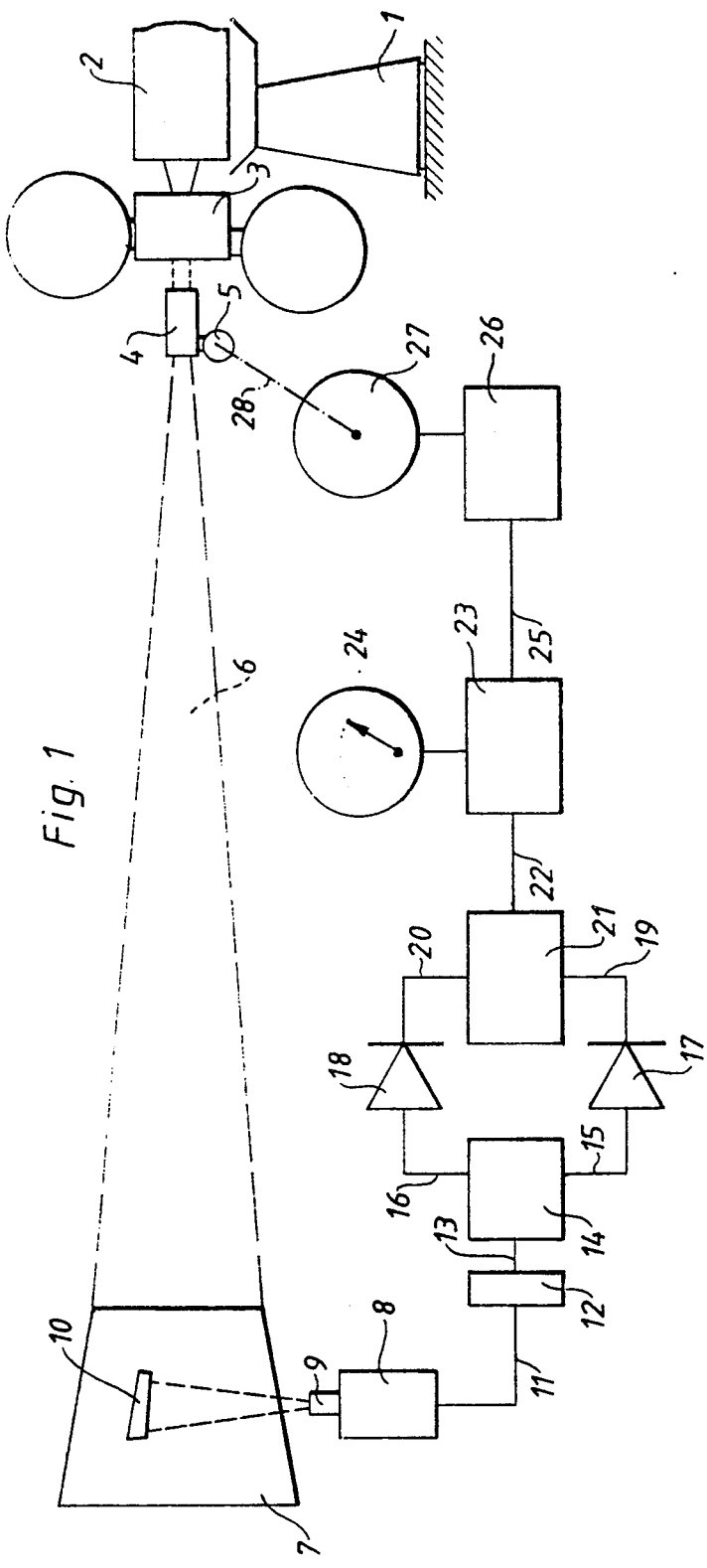
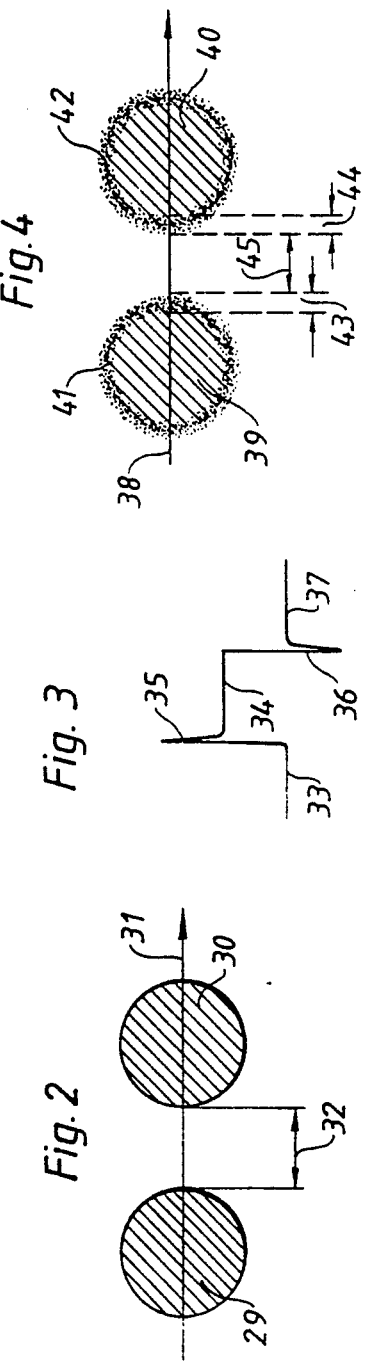

METHOD AND APPARATUS FOR PRODUCING A MEASURED VALUE INDICATIVE OF FOCUSING CORRECTLY ADJUSTED SHARPNESS AT PROJECTED PICTURES

BACKGROUND OF THE INVENTION

Stationary mounted film projectors in cinemas are always located at a predetermined distance from the projection screen in the theater. Focusing the projected image, i.e. adjsuting the optics of the projector, should, in theory, be a non-recurring task, but experience has shown that in practice re-focusing has to be carried out from time to time. For example, deposits from the surface of the film can build up in the film path of the projector which results directly in blurred images, and furthermore the layer structure of the film can vary.

The development within the cinema business has lead to that an operator nowadays has to supervise 8-10 projectors in different auditoria. Quite naturally he is not able then to pay much time and attention to the focusing of the various projectors, which could be inconvenient to the audience, since sharpness is a determining factor when it comes to impression and experience of the picture shown. Also, it can be difficult to find swiftly the correct setting of focus and, in addition, in certain picture sequences it can be hard to judge the proper sharpness of the picture from the projection room. It is often so that the projectionist focuses with the guidance of the translated subtitles occurring in foreign film along the lower edge of the picture. This means that sharpness becomes poorer where best needed, namely, within that part of the screen where the actor's faces mostly appear, i.e. the central area of the screen, at a distance from the top edge of the screen corresponding to about one third of the height of the screen.

In practice there is thus a need for simple and correct focusing means, and earlier several solutions to the problem of focusing have bene proposed. For example, in the Swiss Patent Specification No. 484 443 an apparatus for focusing projected images is described. The basis of this solution is the fact that a sharp image exhibits greater contrasts between light and dark portions, and that a blurred image includes grey tones, i.e. the contrast effect is eliminated. However, it is difficult in practice, in particular when cinematographic pictures are concerned, to utilize grey tone conditions for providing focusing parameters. Several specific steps have to be taken in order that normal fluctuations in image intensity be eliminated and in order that the two measuring signals be obtained which are to form the basis of a correcting signal.

SUMMARY OF THE INVENTION

In black and white film the colloidal silver is collected in tiny grains, and in color film the color substances form in a corresponding manner flocks, whereby in both cases the film obtains a granulated surface. In correct focusing this granularity can be distinctly seen in the projected image, although not from normal viewing distance. The present invention utilizes the occurrence of the image grains, or the like discontinuities, and generally it is proposed that a section of the projected image be scanned by means of an image sensor with respect to individual image elements, that is, projected grain structures, the signal obtained by the image sensor being fed in the form of a frequency spectrum to means for separating one high and one low frequency band, which in turn are treated in order to provide a measurement value indicative of focusing.

In order to transfer the grain structure of the projected image, a scanning image sensor such as a video camera or the like is preferably used, which delivers an electrical signal related to the grain structure and including a frequency spectrum. The size of the test section, which is suitably rectangular, is adjusted such that the granularity falls within the resolving capacity of the image sensor. Thus the signal obtained by the scanning will contain a frequency spectrum related to the grain density. The spectrum contains higher and lower frequencies, and according to the invention one higher and one lower frequency band are selected, a voltage being created on the basis of these bands by e.g. comparison, which voltage is indicative of focusing. The lower frequency band will then be related to grain density and the higher frequency band to grain contrast.

BRIEF DESCRIPTION OF THE DRAWINGS

The invention will be described in greater detail with reference to the accompanying drawing illustrating an embodiment of the invention.

FIG. 1 is a diagrammatical view of a cinema plant to which the present invention is applied.

FIG. 2 is a view, likewise diagrammatical, of the grain structures in a section of a projected image.

FIG. 3 illustrates a curve obtained when scanning a grain structure according to FIG. 2.

FIG. 4 illustrates the grain structure appearance when the image is out of focus.

DESCRIPTION OF THE PREFERRED EMBODIMENT

The arrangement according to FIG. 1 shows a stand 1 carrying a light projecting device 2 and an associated projector 3. The projector 3 is in turn associated with a projection lens 4 having a rotatable focusing member 5. The luminous beam 6 from the projection lens 4 is directed towards a projection screen 7.

Adjacent said projection screen 7 a scanning image sensor 8 is provided, which is adapted to take in by its lens 9 a small section 10 of the picture projected on the screen. The signal output of the image sensor 8 is connected, by way of a line 11, to a threshold circuit 12 which communicates via a line 13 with a filter circuit 14. The filter circuit 14 is adapted to select two frequency bands, one lower frequency band and one containing the harmonics of the lower frequency band. This lower band, hereinafter designated the grain frequency band, is fed to an output 15 and the harmonics frequency band is fed to an output 16. Rectifiers 17 and 18, respectively, are connected to said outputs, the rectifiers feeding each its input 19 and 20, respectively, to a comparison circuit 21 in order to provide a resulting voltage output on a line 22 to an amplifier 23 in turn feeding an indicating instrument 24. Via a connection 25 the amplifier 23 also feeds a servo amplifier 26, which controls in turn a servo motor 27, communicating by way of a shaft 28 or the like with the focusing member 5 of the projection lens 4.

The image caught by the image sensor 8 consists of a greatly enlarged portion of section 10. The enlargement should be such that the grains occurring on the image surface of the sensor 8 are larger than the resolution of the image sensor 8. In FIG. 2 two grains 29, 30 are shown, representing a sharply defined image. If the path of the scanning electron beam during a sweep along line 31 in the said figure is followed, it can be established directly that after passing the grain 29 the beam will run a certain distance 32 until the edge of the next grain is reached. The section between the grains is bright, and a sweep will result in a voltage variation related to the dark grains and the bright portions therebetween. Thus when an electron beam sweeps across a plurality of grains, the grain frequency band is obtained, which is related to the spacing of the grains. As a matter of course, in practice the interstices between dark grains could accommodate lighter grains, or grains of varying opacity. However, the frequency bands will be formed equivalently.

In transition from a dark portion, i.e. a grain as shown, to the space between the grains, a jumping voltage change appears in the output signal and likewise there is a jumping change when the electron beam reaches the next edge of the grain. The curve shown in FIG. 3 illustrates this procedure, the curve line 33 showing the voltage level when the beam passes the grain 29, whereas curve line 34 shows said level when the beam passes the interspace, that is the bright field 32. At the transition a voltage swing occurs, that is, a transient voltage 35 forming harmonics to the grain frequency band previously mentioned. Likewise there is a voltage reduction at the transition from the bright portion 32 to the grain 30, said reduction also causing a voltage swing 36, later passing over into the voltage level 37, representative to the dark grain 30.

The circumstances now described relate to a sharply focused image, i.e. where the edges of the grains are completely defined, for which reason the transitions between light and dark portions become very distinct. FIG. 4 illustrates a sweep 38 across two grains 39 and 40 representing a situation when the projected image is out of focus. As can be seen, the grain boundaries are no longer distinct and sharp but blurred as indicated in the figure, said boundaries being designated 41 and 42, respectively. When the beam sweeps across e.g. the grain 39 and approaches the edge to be left, the beam will pass a zone 43 representing a light intensity which gradually changes from the blackness of the grain to the bright interspace. Likewise there is a similar area 44 where the electron beam enters its path across the grain 40. The remaining interspace 45 is less than the white field 32 of FIG. 2. The diffuse transition sections at the grain edges cause the transient voltages to be considerably lower in relationship to those obtained at sharp focusing.

The arrangement of FIG. 1 operates in the following way. As shown it is assumed that a section 10 is picked up by the image sensor 8, said section being located at a distance from the top edge of the projected picture corresponding to about one third of the height of the picture 7. As mentioned by way of introduction, it is within this area the greatest sharpness is necessary in order to offer the spectator a pleasant view of the picture per se. The output signals from the image sensor when the picture is in sharp focus have, for example, the shape illustrated by FIG. 3. In order that distinct signals for processing be attained, the signals arriving from the image sensor by line 11 are passed through a threshold circuit 12 which is adjusted taking practical conditions into consideration, e.g. basic noise signals. The outgoing signals in line 13, thus containing a frequency spectrum, are now treated in the filter circuit 14 to separate the grain frequency band, which is delivered at output 15.

The frequency band including said harmonics, generated by the transient oscillations 35, 36 are delivered to output 16. The separated frequency bands containing the signals are rectified individually by the rectifiers 17 and 18 and are fed to the respective inputs 19 and 20 of the comparator 21. As a a result there is obtained from the latter a difference signal in line 22. This signal is applied to the amplifier 23, the strength of the signal obtained being possible to read on the instrument 24 connected to said amplifier. As a matter of course it is also possible here, by reading instrument 24, to focus manually be operating the member 5 of the projection lens 4. Thus maximum instrument deflection indicates best focusing. However, the signal obtained here can control, by way of the connection 25, the servo amplifier 26 operating the servo motor 27 in order to focus automatically by actuating said member 5 via the shaft 28. The servo amplifier 26 must of course include such compensation or feedback circuitry which controls focusing so that servo hunting is avoided.

If the projection screen 7 should show a blurred image as previously explained a grain representation as shown in FIG. 4 would occur. The harmonics generated hereby will exhibit a lower amplitude in relation to the case when sharply focused, with the result that the voltage appearing at the output 16 of circuit 14 will reach a relatively lower level. This, in turn, will have as a consequence that the resultant voltage, appearing in line 22 for the controlling amplifier 23 and instrument 24, will have a lower value. By the feature that the grain frequency band and the harmonics frequency band at all time are related to one another by the circuit 21, errors in measurement are avoided. The light intensity affects the amplitude of both frequency bands and by treatment in the comparator circuit an action of relating is brought about with the result that only one output voltage is obtained, which is conditioned by differences. The comparatively lower voltage occurring when an image is out of focus appears in lines 22, 25, with the result that member 5 is operated such, by the servo motor 27, that the condition of sharpness is restored.

The advantage of using image grains, and distribution of image grains, is obvious as here it is not necessary to consider grey tones previously dealt with. The grey tones themselves are, as a matter of fact, the result of grain density. By measuring on grains and interspaces, or light and dark grains, one has at all times an unambiguous starting point, namely, the disposal of distinctly dark and distinctly bright portions as parameters in the measurement procedure.

In connection with projecting cinematographic film there are appearing, on the one hand, frame changing intervals and, on the other, intermediate intervals of shuttering causing dark periods. Hereby a light changing frequency arises which seemingly could disturb the function of the arrangement disclosed above. However, said frequency is so low that it can be excluded by filters from the other frequencies occurring in the arrangement. But to avoid in certain cases disturbances caused by said frame changing (and possibly so called image swing caused by deficiencies in the film feeding mechanism, film shrinking and the like) scanning of the section 10 of the picture area 7 can take place during short intervals in synchronism with the frame feed itself. By the use of modern technics, however, the scanning processes of any screen section can be conducted during very short intervals and, as a matter of fact, during each moment of projection the picture frame itself is standing still in the projector.

In this connection it should be pointed out that the servo device 26, 27 could be controlled in such a way that it is activated intermittently during the course of the film show, that is, it is not in operation continuously, which could be an advantage during certain conditions of projection.

The invention can also be used for checking the quality of projection equipment. Together with a reference film having a known image sharpness a measure of the quality of the equipment can readily be obtained by reading the deflection of the instrument 24 and comparing this deflection with that obtained when using standardized equipment. In such a case the apparatus according to the invention should preferably be made portable.

An important application of the invention is related to the quality control of a movie film print. In many cases the price of a film print is dependent on the quality of the copying work. By running a perfect film print in a standard projection plant, a reference value of the quality can be read on the instrument 24. When running other prints the readings on the instrument are compared with those obtained when the reference print was run. In order to ensure that a correct quality value be read, it would be advisable to connect, instead of an instrument, a printer, possibly preceded by a digital processing circuit.

Raw film, exposed from a suitable focus test chart and developed, can also be quality controlled in an equivalent manner.

As a matter of course it is possible within the scope of the invention to apply digital technics in the present connection for counting again frequency and harmonics, in doing which the information obtained can be processed in a micro-computer in turn controlling the focusing of the projector. Of course other types of image sensors other than video cameras can be used in the present case for attaining the same goal. What is essential is that there is obtained, on the one hand, frequencies conditioned by the grain or the like discontinuity interstices and, on the other hand, a formation of harmonics related thereto at the transitions between dark and light portions.

What is claimed is:

1. A method for producing a measurement value to correct focusing of projected images or indicative of film print qualities or projection apparatus qualities including the following steps:
    scanning a section of the projected image by means of an image sensor with respect to individual image elements such as grains or similar discontinuities;
    feeding a signal obtained by the image sensor in the form of a frequency spectrum to a means for separating a low frequency band and a high frequency band, said low frequency band comprising a frequency or those frequencies generated by a sweep scanning of grains or similar discontinuities occurring in a scanning path and said high frequency band comprising transient oscillations forming harmonics to the frequency or frequencies of the low frequency band;
    wherein generation of said transient oscillations is performed at the transition from grains to interstices between grains and from interstices to grains, or at the transition between grains of different opacity;
    converting said low and high frequency bands to signals or states which are subjected to treatment for comparison so that a resultant value is obtained representing a difference between the signals or states, said value being indicative of focusing or indicative of film print qualities or indicative of projection apparatus qualities independent of the light intensity of the image.

2. The method according to claim 1, wherein reproducing of the image section on the image sensor is selected such that the grain size becomes greater than the resolution of the image sensor.

3. The method according to claim 1, wherein said resultant value is read when running a reference film in standardized equipment, the value read being compared with those values obtained when running the reference film in equipment to be controlled with respect to its quality.

4. The method according to claim 1, wherein a reference film is run in standardized equipment, said resultant value being read during such running, after which those values obtained when running films to be quality controlled are compared with said first read values.

5. The method according to claim 1, wherein the reference film consists of a film exposed from a focus test chart and developed, and that those films to be quality controlled are lengths of raw films which have been exposed and developed in an equivalent manner.

6. An apparatus for producing a measurement value to correct focusing of projected images or indicative of film print qualities or projection apparatus qualities, comprising:
    a scanning image sensor adapted to scan a section of a projected image, the output of the image sensor being connected to a separator circuit for separating a low frequency band and a high frequency band, which are then directed to a comparator circuit in communication with an indicating means which is indicative of focusing optimal sharpness of the projected image.

7. The method according to claim 6, wherein signals which form said low and high frequency bands are rectified in rectifiers introduced between said separator circuit and said comparator circuit.

8. The method according to claim 6, wherein said indicating means comprises an amplifier and an indicator instrument connected to the amplifier.

9. The method according to claim 8, wherein servo means is connected to said amplifier and controlled by the output signals therefrom, said servo means being connected to members for focusing in projection equipment the image projected.

10. The method according to claim 6, wherein the output of the image sensor is in communication with the separator circuit by way of a threshold circuit.

11. The method according to claim 9, wherein means for controlling the function of the apparatus is brought into operation only intermittently when the projected image appears, whereby the periods of operation become synchronized with the frame frequency of the projection equipment.

* * * * *